(12) United States Patent
Kamata

(10) Patent No.: US 8,981,599 B2
(45) Date of Patent: Mar. 17, 2015

(54) POWER FEEDING DEVICE AND CONTACTLESS POWER FEEDING SYSTEM PROVIDED WITH POWER FEEDING DEVICE

(75) Inventor: Koichiro Kamata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 501 days.

(21) Appl. No.: 13/316,626

(22) Filed: Dec. 12, 2011

(65) Prior Publication Data

US 2012/0161537 A1    Jun. 28, 2012

(30) Foreign Application Priority Data

Dec. 24, 2010 (JP) ................... 2010-287380

(51) Int. Cl.
*H01F 38/14* (2006.01)
*H02J 5/00* (2006.01)
*H01F 27/00* (2006.01)

(52) U.S. Cl.
CPC .............. *H01F 38/14* (2013.01); *H02J 5/005* (2013.01); *H01F 27/006* (2013.01)
USPC ........................................ 307/104

(58) Field of Classification Search
USPC ........................................ 307/104
See application file for complete search history.

(56) References Cited

U.S. PATENT DOCUMENTS

| 8,310,108 B2 * | 11/2012 | Inoue et al. ............. 307/104 |
| 8,362,744 B2 * | 1/2013 | Terao et al. ............. 320/108 |
| 8,531,059 B2 | 9/2013 | Ichikawa et al. |
| 2010/0244577 A1 | 9/2010 | Shimokawa |
| 2010/0259109 A1 | 10/2010 | Sato |
| 2010/0315038 A1 | 12/2010 | Terao et al. |
| 2010/0328044 A1 | 12/2010 | Waffenschmidt et al. |
| 2011/0241440 A1 * | 10/2011 | Sakoda et al. ............. 307/104 |
| 2012/0032521 A1 | 2/2012 | Inoue et al. |

FOREIGN PATENT DOCUMENTS

| CN | 101529691 A | 9/2009 |
| CN | 101771297 A | 7/2010 |
| EP | 2421121 A | 2/2012 |
| JP | 2010-193598 | 9/2010 |
| JP | 2010-239690 | 10/2010 |

(Continued)

OTHER PUBLICATIONS

Chinese Office Action (Application No. 201110436920.4) Dated Dec. 2, 2014.

*Primary Examiner* — Rexford Barnie
*Assistant Examiner* — Daniel Kessie
(74) *Attorney, Agent, or Firm* — Nixon Peabody LLP; Jeffrey L. Costellia

(57) ABSTRACT

A power feeding device utilizing an electromagnetic resonance coupling method and a contactless power feeding system can be provided. A coupling coefficient of electromagnetic induction coupling in the power feeding device and/or the inside of a power receiving device is optimized to improve electric power transmission efficiency of a resonance frequency regardless of positions of the power feeding device and the power receiving device. Provided is a power feeding device or a contactless power feeding system in which an S11 parameter which is a reflection component of electric power output from a high-frequency power source of the power feeding device is monitored, and one or both of positions of a transmission coil and a first resonant coil in the power feeding device and positions of a reception coil and a second resonant coil in a power receiving device are changed to adjust a coupling coefficient of electromagnetic induction coupling.

19 Claims, 16 Drawing Sheets

103: high-frequency power source  104: coupler
105: transmission coil  106: first resonant coil
107: capacitor  108: detector
110: moving unit
111: first resonant circuit  112: second resonant coil
113: capacitor  114: reception coil
115: load

(56) References Cited

FOREIGN PATENT DOCUMENTS

| | | |
|---|---|---|
| JP | 2010-252446 A | 11/2010 |
| JP | 2010-252468 | 11/2010 |
| JP | 2011-167036 | 8/2011 |
| WO | WO-2008/050260 | 5/2008 |
| WO | WO 2011-099106 A1 | 8/2011 |

* cited by examiner 101 power feeding device 102 power receiving device

103: high-frequency power source  104: coupler
105: transmission coil           106: first resonant coil
107: capacitor                   108: detector
110: moving unit
111: first resonant circuit      112: second resonant coil
113: capacitor                   114: reception coil
115: load 101 power feeding device
102 power receiving device 103: high-frequency power source
105: transmission coil
112: second resonant coil
115: load
106: first resonant coil
114: reception coil 101 power feeding device
102 power receiving device 103: high-frequency power source  104: coupler
105: transmission coil             106: first resonant coil
107: capacitor                     111: first resonant circuit 101 power feeding device
102 power receiving device 103: high-frequency power source  104: coupler
105: transmission coil  106: first resonant coil
107: capacitor 101 power feeding device
102 power receiving device 103: high-frequency power source 104: coupler
105: transmission coil 106: first resonant coil
107: capacitor 108: detector
110: moving unit
112: second resonant coil 113: capacitor
114: reception coil 115: load

FIG. 6

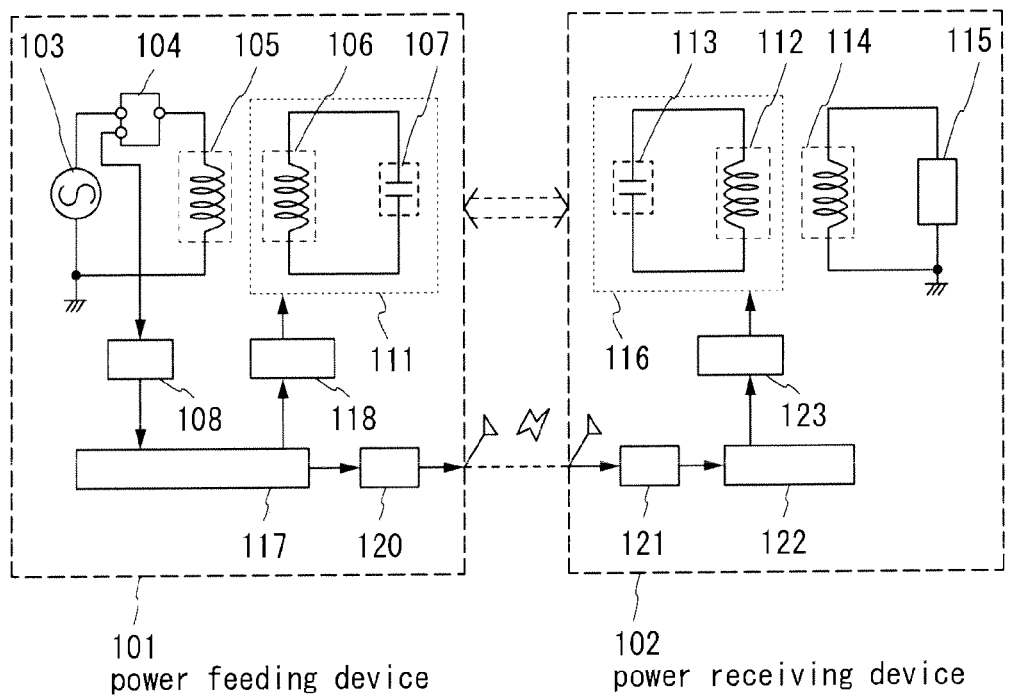

101 power feeding device
102 power receiving device

103: high-frequency power source 104: coupler
105: transmission coil 106: first resonant coil
107: capacitor 108: detector
111: first resonant circuit 112: second resonant coil
113: capacitor 114: reception coil
115: load 116: second resonant circuit
117: first control circuit 118: first moving unit
120: first transmission/reception circuit
121: second transmission/reception circuit
122: second control circuit
123: second moving unit 101 power feeding device
102 power receiving device 103: high-frequency power source
105: transmission coil                106: first resonant coil
112: second resonant coil             114: reception coil
115: load

FIG. 9A

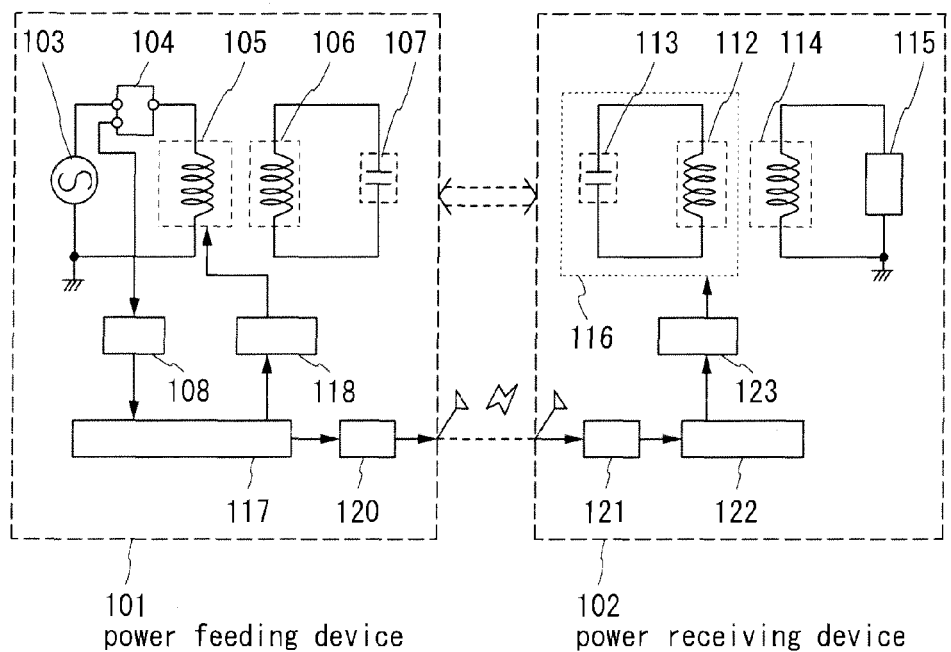

101 power feeding device
102 power receiving device

103: high-frequency power source 104: coupler
105: transmission coil            106: first resonant coil
107: capacitor                    108: detector
112: second resonant coil         113: capacitor
114: reception coil               115: load
116: second resonant circuit      117: first control circuit
118: first moving unit
120: first transmission/reception circuit
121: second transmission/reception circuit
122: second control circuit
123: second moving unit 103: high-frequency power source 104: coupler
105: transmission coil 106: first resonant coil
107: capacitor 108: detector
111: first resonant circuit 112: second resonant coil
113: capacitor 114: reception coil
115: load 117: first control circuit
118: first moving unit
120: first transmission/reception circuit
121: second transmission/reception circuit
122: second control circuit
123: second moving unit 103: high-frequency power source  104: coupler
105: transmission coil  106: first resonant coil
107: capacitor  108: detector
112: second resonant coil  113: capacitor
114: reception coil  115: load
117: first control circuit
120: first transmission/reception circuit
121: second transmission/reception circuit
122: second control circuit
123: second moving unit 101 power feeding device
102 power receiving device 103: high-frequency power source  104: coupler
105: transmission coil  106: first resonant coil
107: capacitor  108: detector
112: second resonant coil  113: capacitor
114: reception coil  115: load
117: first control circuit
120: first transmission/reception circuit
121: second transmission/reception circuit
122: second control circuit
123: second moving unit 101 power feeding device
102 power receiving device 103: high-frequency power source
105: transmission coil        106: first resonant coil
112: second resonant coil     114: reception coil
115: load

POWER FEEDING DEVICE AND CONTACTLESS POWER FEEDING SYSTEM PROVIDED WITH POWER FEEDING DEVICE

BACKGROUND OF THE INVENTION

1. Field of the Invention

The present invention relates to a power feeding device and a contactless power feeding system provided with the power feeding device.

2. Description of the Related Art

In recent years, various kinds of electronic devices have been spread and various products have been on the market. In recent years, while spread of a portable electronic device, such as a mobile phone and a digital video camera, is noticeable, a electric vehicle which is driven by electric power, such as an electric car and a hybrid car, begins to appear, on the market.

Such an electronic device and a electric vehicle usually include a battery as a storage means. For now, a power feeding method for charging the battery is direct contact between a household alternating current power supply and the battery.

On the other hand, a power feeding method in which a battery is charged without contact has been researched and developed. Examples of typical methods thereof are an electromagnetic coupling method (also referred to as an electromagnetic induction method), an electric wave method (also referred to as a microwave method), an electromagnetic resonance method (also referred to as an electromagnetic resonance coupling method) and the like.

Note that various contactless power feeding methods utilizing the electromagnetic resonance method are developed so as to increase in electric power transmission efficiency (power transmission efficiency), as shown in Patent Documents 1 to 3. In the case of a contactless power feeding method utilizing the electromagnetic resonance method, the maximum electric power transmission efficiency is not always obtained even when resonance frequencies of a device receiving electric power (hereinafter, a power receiving device) and a device supplying electric power (hereinafter, a power feeding device) are the same as each other. In improvement of transmission efficiency, an important factor is a coupling coefficient of electromagnetic resonance coupling between the power feeding device and the power receiving device, but a too-high coupling coefficient results in decrease in transmission efficiency. The coupling coefficient of electromagnetic resonance coupling changes depending on positions of (the distance between) the power feeding device and the power receiving device. Therefore, in order that electric power is stably-transmitted utilizing a resonant contactless power feeding technique, it is important to control the transmission efficiency to the maximum regardless of the positions of the power feeding device and the power receiving device (the coupling coefficient of electromagnetic resonance coupling).

REFERENCE

[Patent Document 1] Japanese Published Patent Application No. 2010193598

[Patent Document 2] Japanese Published Patent Application No. 2010-239690

[Patent Document 3] Japanese Published Patent Application. No. 2010-252468

SUMMARY OF THE INVENTION

In an embodiment of the present invention, a power feeding device utilizing an electromagnetic resonance coupling method and a contactless power feeding system provided with the power feeding device can be provided, in which in contactless power feeding by the electromagnetic resonance coupling method, a coupling coefficient of electromagnetic induction coupling in the power feeding device and/or the inside of a power receiving device is optimized to improve electric power transmission efficiency of a resonance frequency regardless of positions (coupling coefficient of electromagnetic resonance coupling) of the power feeding device and the power receiving device.

An embodiment of the present invention is a power feeding device or a contactless power feeding system in which an S11 parameter which is a reflection component of electric power output from a high-frequency power source of the power feeding device is, monitored, and one or both of positions of (a distance between) a transmission coil and a first resonant coil in the power feeding device and positions of (a distance between) a reception coil and a second resonant coil in a power receiving device are changed to adjust a coupling coefficient of electromagnetic induction coupling. In this manner, the S11 parameter can be minimized and the electric power transmission efficiency can be improved regardless of the positions (coupling coefficient of electromagnetic resonance coupling) of the power feeding device and the power receiving device.

An embodiment of the present invention is a power feeding device including a transmission coil electrically connected to a high-frequency power source, a resonant circuit comprising a resonant coil configured to perform electromagnetic induction coupling with the transmission coil, a detector configured to detect a reflection of electric power output from the high-frequency power source, a control circuit electrically connected to the detector, and a moving unit electrically connected to the control circuit. The moving unit controls a position of the resonant, circuit in accordance with a signal transmitted from the control circuit in accordance with the reflection.

Note that in the above structure, the moving unit may control position of the transmission coil.

An embodiment of the present invention is a contactless power feeding system which is a power feeding device configured to transmit electric power in accordance with electromagnetic resonance coupling, and a power receiving device. The power feeding device includes a transmission coil electrically connected to a high-frequency power source, a resonant circuit comprising a resonant coil configured to perform electromagnetic induction coupling with the transmission coil, a detector configured to detect a reflection of electric power output from the high-frequency power source, a control circuit electrically connected to the detector, and a moving unit electrically connected to the control circuit. The moving unit controls a position of the resonant circuit in accordance with a signal transmitted from the control circuit in accordance with the reflection.

Note that in the above structure, the moving unit may control, position of transmission coil.

An embodiment of the present invention is a contactless power feeding system which is a power feeding device configured to transmit electric power in accordance with electromagnetic resonance coupling, and a power receiving device. The power feeding device includes a transmission coil electrically connected to a high-frequency power source, a first resonant circuit comprising a first resonant coil configured to perform electromagnetic induction coupling with the transmission coil, a detector configured to detect a reflection of electric power output from the high-frequency power source, a first control circuit electrically connected to the detector, and a first transmission/reception circuit electrically connected to the first control circuit. The power-receiving device includes a reception coil electrically connected to a load, a second resonant circuit including a second resonant coil configured to perform electromagnetic induction coupling with the reception coil, a second transmission/reception circuit, a second control circuit electrically connected to the second transmission/reception circuit, and a moving unit electrically connected to the second control circuit. In accordance with the reflection, a signal transmitted from the first control circuit is transmitted from the first transmission/reception circuit to the second transmission/reception circuit and then to the second control circuit, and the moving unit controls a position of the second resonant circuit in accordance with the signal transmitted from the second control circuit.

Note that in the above structure, the moving unit may control the position of the transmission coil. Further, in the above structure, positions of the first resonant circuit and the second resonant circuit and/or positions of the transmission coil and the reception coil may be controlled.

In each of the above structures, an S11 parameter may be used as a parameter of the reflection component.

According to an embodiment of the present invention, a power feeding device utilizing an electromagnetic resonance coupling method and a contactless power feeding system provided with the power feeding device can be provided in which the coupling coefficient of electromagnetic induction coupling in the power feeding device or a power receiving device is optimized to improve electric power transmission efficiency of a resonance frequency regardless of the positions of (a distance between) the power feeding device and the power receiving device.

BRIEF DESCRIPTION OF THE DRAWINGS

FIG. 6 is a diagram illustrating Embodiment 2.
FIGS. 9A and 9B are diagrams illustrating Embodiment 2.

DETAILED DESCRIPTION OF THE INVENTION

Figure 1:
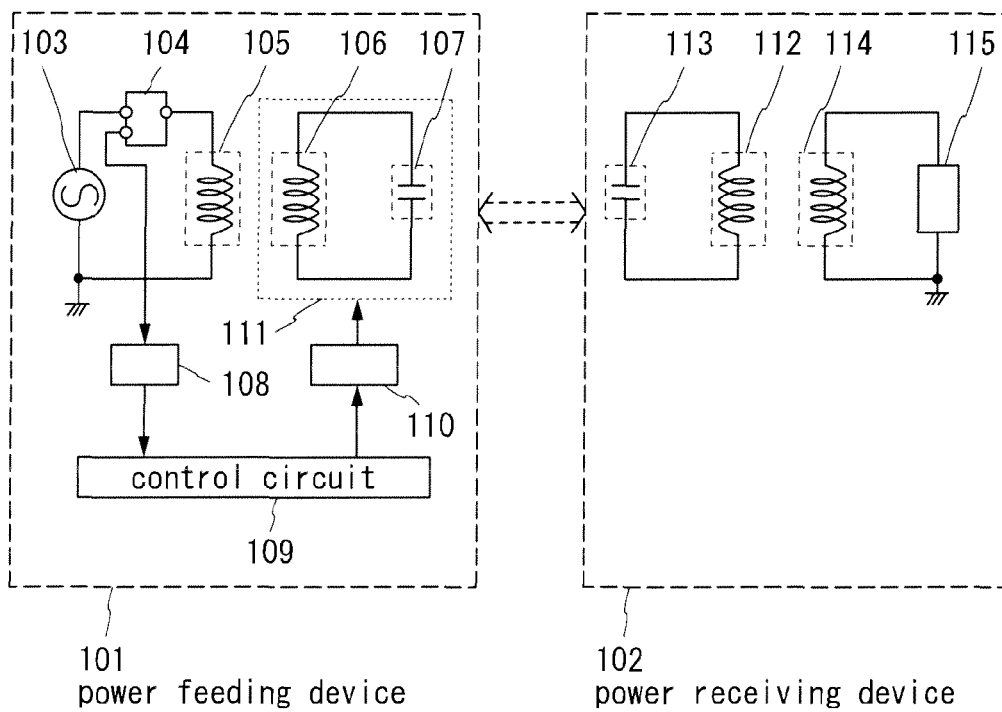
FIG. 1 is a diagram illustrating Embodiment 1.

Hereinafter, embodiments of the present invention will be described with reference to the accompanying drawings. However, the present invention can be carried out in many different modes, and it is easily understood by those skilled in the art that modes and details of the present invention can be modified in various ways without departing from the purpose and the scope of the present invention. Therefore, the present invention should not be construed as being limited to the following description of the embodiments. Note that in structures of the present invention described below, reference numerals denoting the same portions are used in common in different drawings.

Embodiment 1

In this embodiment, a power feeding device which performs contactless power feeding utilizing an electromagnetic resonance method and a contactless power feeding system utilizing the electromagnetic resonance method, which are an embodiment of the present invention, will be described. Specifically, in order to minimize a reflection component of electric power output from a high-frequency power source of the power feeding device, a position (d) of a first resonant coil 106 or a first resonant circuit 111 of a power feeding device 101 is transferred on the basis plan, S11 parameter showing a reflection component. Note that to minimize the S11 parameter showing a reflection component means to maximize the S21 parameter showing transmission efficiency.

FIG. 1 illustrates a block diagram of the power feeding device 101 and a power receiving device 102. Note that the power feeding device 101 can transmit electric power to the power receiving device 102 without contact by resonance coupling (also referred to as electromagnetic resonance coupling) of resonant coils of the devices.

The power feeding device 101 includes a high-frequency power source 103, a coupler (also referred to as a directional coupler) 104, a transmission coil 105, the first resonant coil 106, a capacitor 107, a detector 108, a control circuit 109, a moving unit 110, and the first resonant circuit 111. Note that the capacitor 107 may be floating capacitance.

The power receiving device 102 includes a second resonant coil 112, a capacitor 113, a reception coil 114, and a load 115. Note that the capacitor 113 may be floating capacitance.

In the power feeding device 101, the transmission coil 105 is electrically connected to the high-frequency power source 103 through the coupler 104. Note that the transmission coil 105 may be a coil formed by a mound wire or the like, and is usually one turn of a loop coil.

The high-frequency power source 103 is a power supply circuit which can output a predetermined high-frequency voltage (e.g., about several megahertz to ten and several megahertz). Any frequency (oscillation frequency) oscillated with an AC voltage signal output from the high-frequency power source 103 of the power feeding device 101 in this embodiment can be employed as long as electric power can be transmitted utilizing the electromagnetic resonance method with the Oscillation frequency. The oscillation frequency of electromagnetic wave for power feeding can be in a several kilohertz frequency band to a several gigahertz frequency band, for example. In particular, in the case of this embodiment, it is preferable to use a several megahertz frequency band because electromagnetic resonance on basis of simple LC resonance can occur; that is, electric power transmission efficiency can be high and the devices are smoothly designed.

The coupler 104 can detect the S11 parameter showing a loss component (hereinafter, referred to as a reflection component) of electric power output from the high-frequency power source 103, which is reflected at the transmission coil 105.

The first resonant coil 106 is provided with the capacitor 107. The first resonant coil 106 can be a coil formed of a wound wire or the like. The impedance (resonance frequency, a Q value) of the first resonant coil 106 can be controlled by a material, cross-sectional area, wiring length, coil diameter, or the like. The Q value of the first resonant coil 106 is preferably set to be high (e.g., 100 or more). The capacitor 107 may be the parasitic capacitance of the first resonant coil 106 or may be provided separately from the first resonant coil 106. In this embodiment, the first resonant circuit includes the first resonant coil 106 and the capacitor 107.

Note that a signal for supplying electric power is transmitted from the transmission coil 105 to the first resonant coil 106 without contact by electromagnetic induction coupling (also referred to as induction coupling).

The detector 108 detects the intensity of the S11 parameter obtained by the coupler 104. Specifically, the detector 108 converts the intensity of the S11 parameter from an analog value to a digital value and transmits the intensity of the S11 parameter as the digital value to the control circuit 109. An amplifier or a rectifier circuit may be provided between the coupler 104 and the detector 108.

The control circuit 109 transmits a signal relating to transfer to the moving unit 110, which can change the position of the first resonant circuit 111 or the position of the first resonant coil 106 included in the first resonant circuit 111, in accordance with the intensity of the S11 parameter output from the detector 108, and controls operation of the moving unit 110. Note that the moving unit 110 operates in accordance with a signal transmitted from the control circuit 109; for example, the moving unit 110 may be an electric motor.

In the power receiving device 102, the second resonant coil 112 is provided with the capacitor 113. The second resonant coil 112 can be a coil formed of a wound wire or the like. The impedance (resonance frequency, a Q value) of the second resonant coil 112 can be controlled by a material, cross-sectional area, wiring length, coil diameter, or the like. It is preferable that the Q value of the second resonant coil 112 be set to be high (e.g., 100 or more) and the second resonant coil 112 be similar to the first resonant coil 106 of the power feeding device 101 in the number of turns, shape, size, and the like. The capacitor 113 may be the parasitic capacitance of the second resonant coil 112 or may be provided separately from the second resonant coil 112.

The reception coil 114 of the power feeding device 101 is electrically connected to the load 115. Note that the reception coil 114 may be a coil formed by a wound wire or the like, and is usually one turn of a loop coil.

The load 115 operates by contactless power feeding; for example, a battery, an electric motor, or the like can be given. Specifically, an electronic device operating with the use of a battery, such as a mobile phone and a electric vehicle can be, given. Note that in the power receiving device 102, a circuit, such as a rectifier circuit and a DCDC converter, for converting AC voltage transmitted to the reception coil 114 into DC voltage used in the load 115 may be provided between the load 115 and the reception coil 114.

Transmission and reception of a signal for supplying electric power without contact by using electromagnetic resonance coupling are performed between the first resonant coil 106 of the power feeding device 101 and the second resonant coil 112 of the power receiving device 102. Electromagnetic resonance coupling which is one of contactless power feeding methods is a method in which electric power can bet transmitted with high efficiency by an electric field or a magnetic field in the case of a distance of 1 meter or shorter, and can transmit electric power greater than electromagnetic induction coupling, which is also one of contactless power feeding methods.

Figure 2:
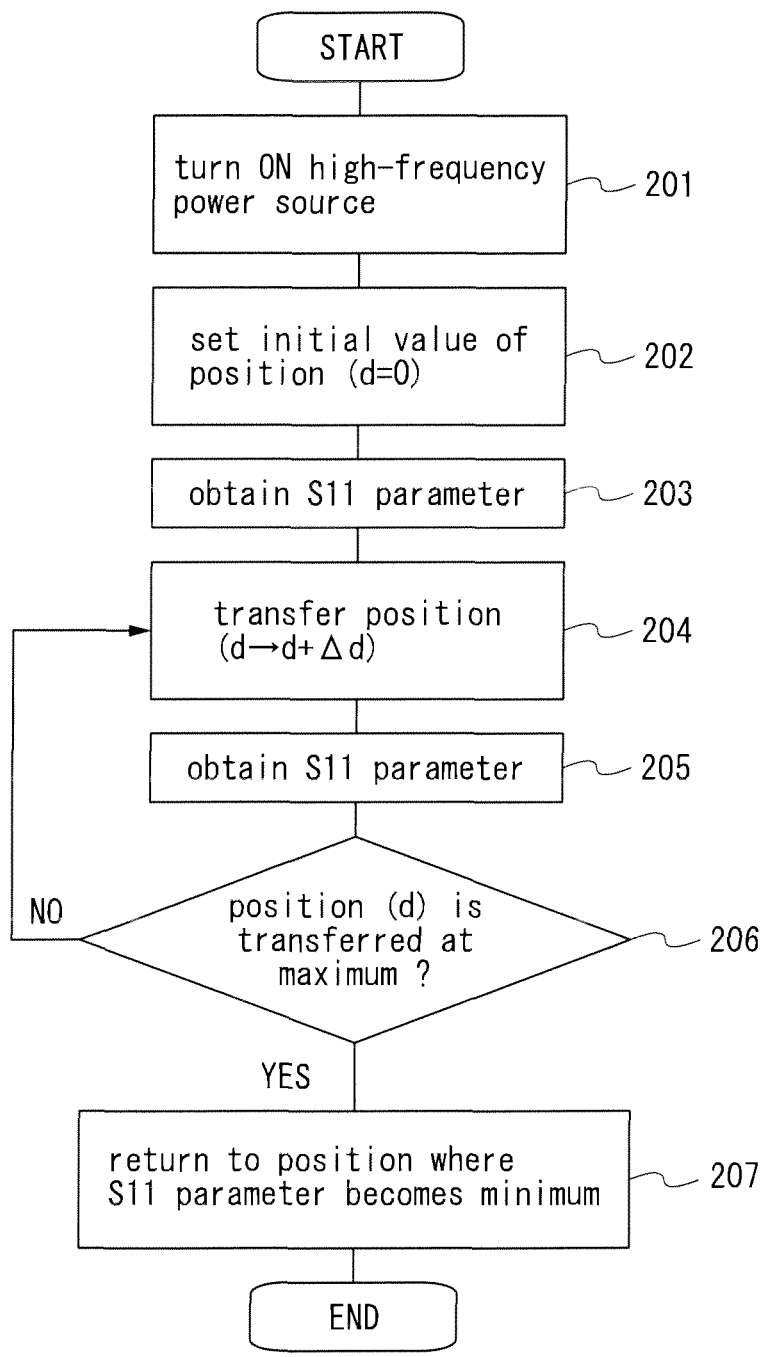
FIG. 2 is a flowchart illustrating Embodiment 1.

Next, FIG. 2 is a flowchart of the contactless power feeding system which is an embodiment of the present invention. Note that the flowchart in FIG. 2 will be explained with reference to the block diagram in FIG. 1.

In a step 201 in FIG. 2, the high-frequency power source 103 is turned ON. Accordingly, AC voltage with a predetermined oscillation frequency ($f_0$) is continuously output.

Next, in a step 202, an initial value of the position (d) of the first resonant coil 106 or the first resonant circuit 111 is set (d=0).

Next, in a step 203, the S11 parameter showing a reflection component of the transmission coil 105 which is output from the detector 108 is obtained.

Next, in a step 204, the moving unit 110 transfers the position (d) of the first resonant coil 106 or the first resonant circuit 111 by Δd (→+Δd) in accordance with a signal transmitted from the control circuit 109 in accordance with the S11 parameter obtained in the step 203.

Next, in a step 205, the S11 parameter showing a reflection component of the transmission coil 105 which is output from the detector 108 is obtained again.

Next, a step 206, in which whether the position (d) of the first resonant coil 106 or the first resonant circuit 111 is transferred at the maximum (d→max) or not is detected, is followed by the step 204 in the case where the position (d) of the first resonant coil 106 or the first resonant circuit 111 is not transferred at the maximum (d→max), and the moving unit 110 transfers the position (d) of the first resonant coil 106 or the first resonant circuit 111 to obtain the S11 parameter. On the other hand, the step 206 is proceeds to a step 207 in the case where the position (d) of the first resonant coil 106 or the first resonant circuit 111 is transferred at the maximum (d→max), and the position (d) of the first resonant coil 106 or the first resonant circuit 111 is returned to a position at which the S11 parameter becomes minimum again among positions at which the position (d) of the first resonant coil 106 or the first resonant circuit 111 has been.

Figure 3:
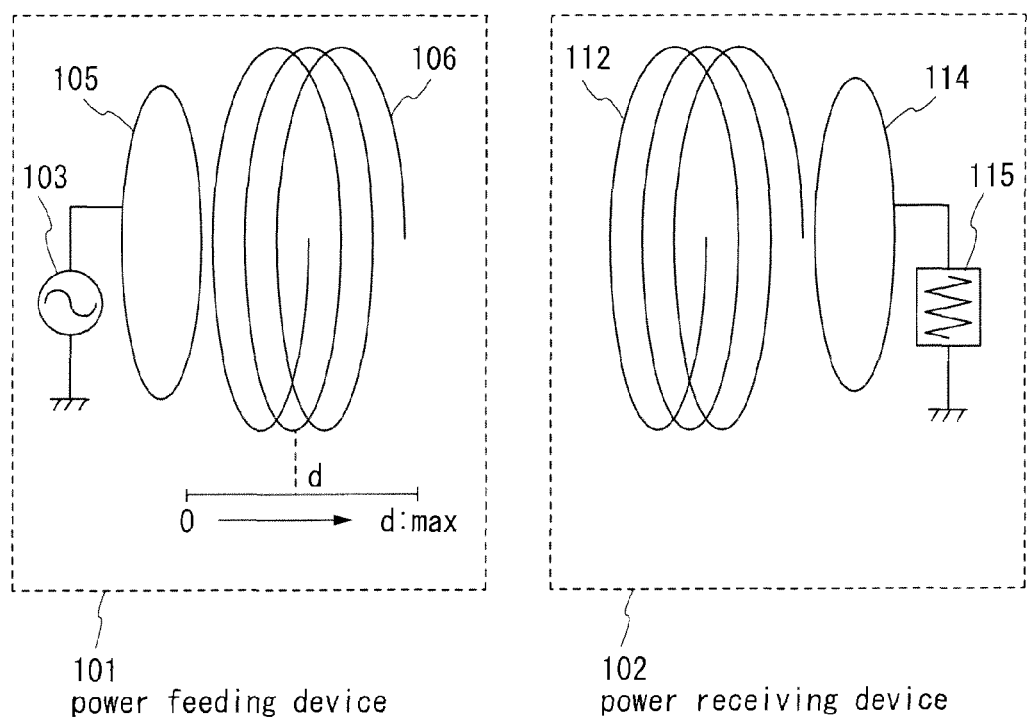
FIG. 3 is a diagram illustrating Embodiment 1.
Figure 4A:
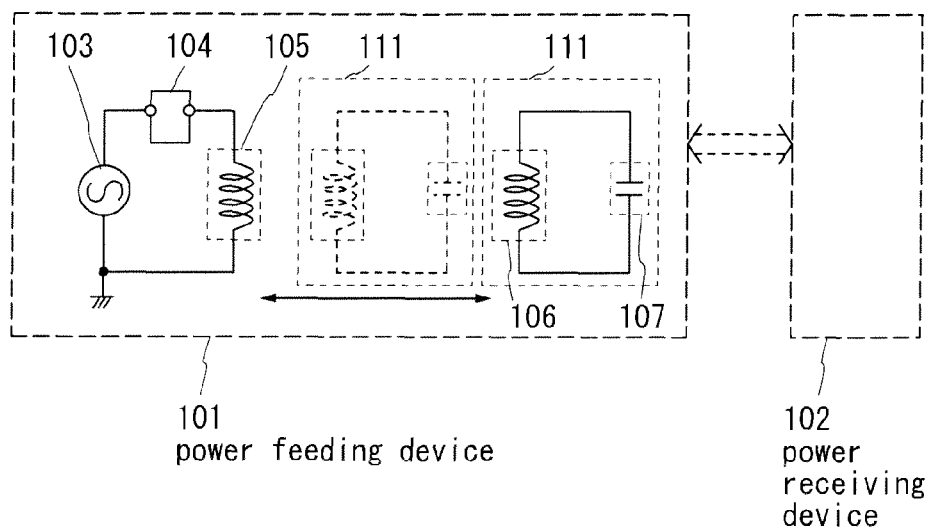
FIGS. 4A and 4B are diagrams illustrating Embodiment 1.
Figure 4B:
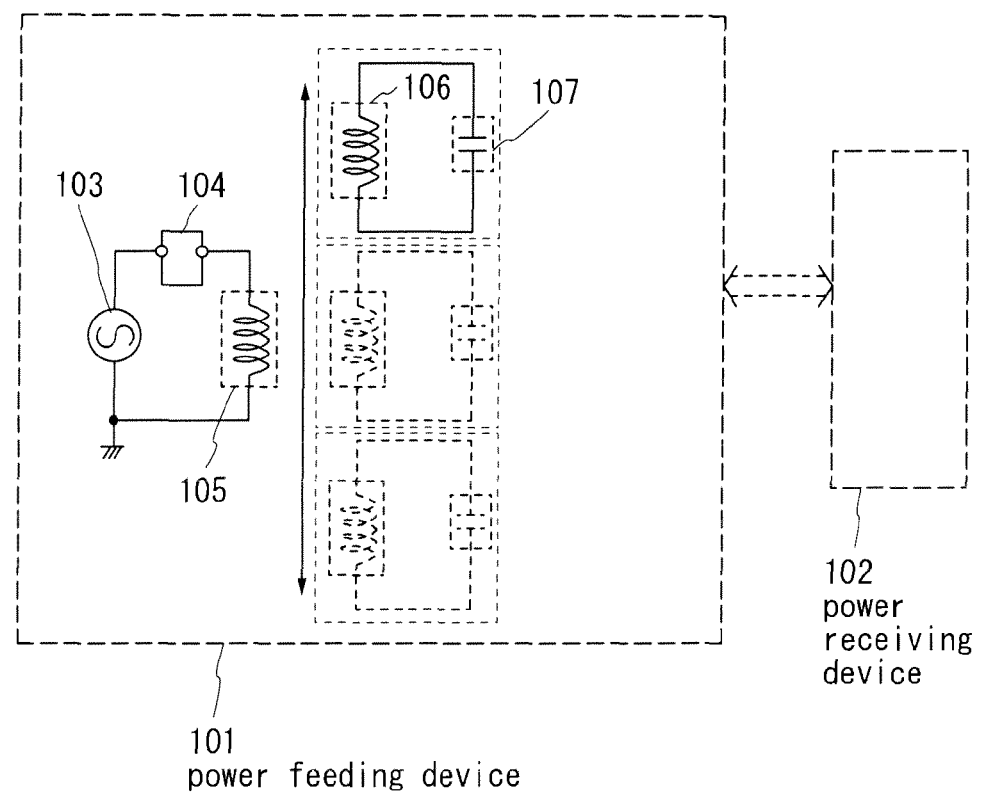

Note that the position (d) of the first resonant coil 106 or the first resonant circuit 111 is transferred as shown in FIG. 3. That is to say, the moving unit 110 transfers the position (d) of the first resonant coil 106 from the initial value (d=0) to the maximum value (d=max). Note that the first resonant circuit 111 including the capacitor is transferred as shown in FIG. 4A in a similar manner to FIG. 3 where the capacitor is omitted. Further, as shown in FIG. 4B, the transferring direction may be different from that in FIG. 4A. That is to say, any transferring direction can be employed as long as the position at which the S11 parameter is the minimum.

Figure 5:
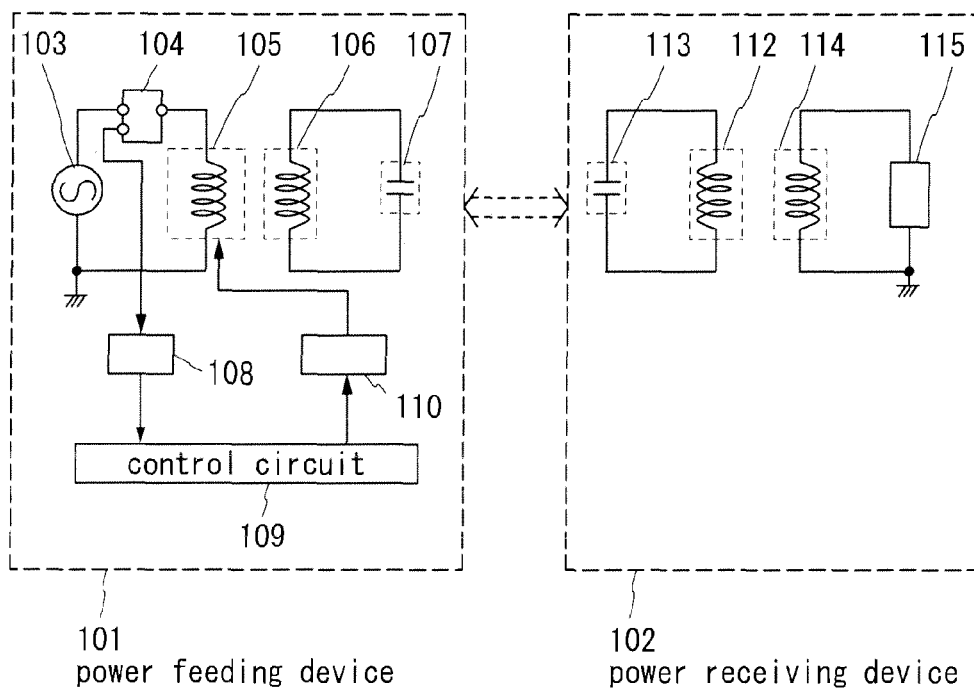
FIG. 5 is a diagram illustrating Embodiment 1.

Further, in the structure shown in this embodiment, the moving unit 110 may transfer the position of the transmission coil 105 in accordance with a signal transmitted from the control circuit 109 in accordance with the S11 parameter as shown in FIG. 5. Note that also in this case, the structure is similar to the above-described structure in which the first resonant coil 106 or the first resonant circuit 111 is transferred except that the moving unit 110 transfers the transmission coil 105; therefore, the explanation is omitted.

An embodiment of the present invention shown in this embodiment can provide a power feeding device utilizing an electromagnetic resonance coupling method, and a contactless power feeding system provided with the power feeding device. In the power feeding device, regardless of a power feeding device, and a power receiving device (coupling coefficient of electromagnetic resonance coupling), the coupling coefficient of electromagnetic induction coupling is adjusted by change in positions of a transmission coil and a resonant coil in the power feeding device, and a reflection component (S11 parameter) of electric power output from a high-frequency power source can be the minimum; accordingly, electric power transmission efficiency can be improved.

Note that this embodiment can be implemented in combination with any of the structures described in other embodiments, as appropriate.

Embodiment 2

In this embodiment, a power feeding device which performs contactless power feeding utilizing the electromagnetic resonance method and a contactless power feeding system utilizing the electromagnetic resonance method, which are an embodiment of the present invention, will be described. Specifically, in order to minimize a reflection component of electric power output from a high-frequency power source of the power feeding device, a position (d) of a first resonant coil 106 or a first resonant circuit 111 of a power feeding device 101, and the second resonant coil 112 of the power receiving device 102 or a position (d) of a second resonant circuit 116, are transferred on the basis of an S11 parameter showing a reflection component. Note that to minimize the S11 parameter showing a reflection component means to maximize the S21 parameter showing transmission efficiency.

FIG. 6 illustrates a block diagram of the newer feeding device 101 and the power receiving device 102. Note that the power feeding device 101 can transmit electric power to the power receiving device 102 without contact by resonance coupling (also referred to as electromagnetic resonance coupling) of resonant coils of the devices.

The power feeding device 101 includes the high-frequency power source 103, the coupler (also referred to as a directional coupler) 104, the transmission coil 105, the first resonant coil 106, the capacitor 107, the detector 108, a first control circuit 117, a first moving unit 118, the first resonant circuit 111, and a first transmission/reception circuit 120.

The power receiving device 102 includes the second resonant coil 112, the capacitor 113, the reception coil 114, the load 115, the second resonant circuit 116, a second transmission/reception circuit 121, a second control circuit 122, and a second moving unit 123.

The structures of the high-frequency power source 103, the coupler 104, the transmission coil 105, the first resonant coil 106, the capacitor 107, and the detector 108 in the power feeding device 101 are similar to those in Embodiment 1; therefore, the explanation is omitted.

The first control circuit 117 transmits a signal relating to transfer to the first moving unit 118, which can change the position of the first resonant circuit 111 or the position of the first resonant coil 106 included in the first resonant circuit 111, in accordance with the intensity of the S11 parameter output from the detector 108, and controls operation of the first moving unit 118. Further, the first control circuit 117 transmits a signal in accordance with the intensity of the S11 parameter, which is output from the detector 108; to the second transmission/reception circuit 121 through the first transmission/reception circuit 120, and then, transmits to the second control circuit 122. Here, the second control circuit 122 which receives a signal in accordance with the intensity of the S11 parameter transmits a signal relating to transfer to the second moving unit 123, which can shift the position of the second resonant circuit 116 or the position of the second resonant coil 112 included in the second resonant circuit 116, in accordance with the intensity of the S11 parameter, and controls operation of the second moving unit 123.

Next, flowchart of the contactless power feeding system which is an embodiment of the present invention. Note that the flowchart in FIG. 7 is explained with reference to the block diagram in FIG. 6.

Figure 7:
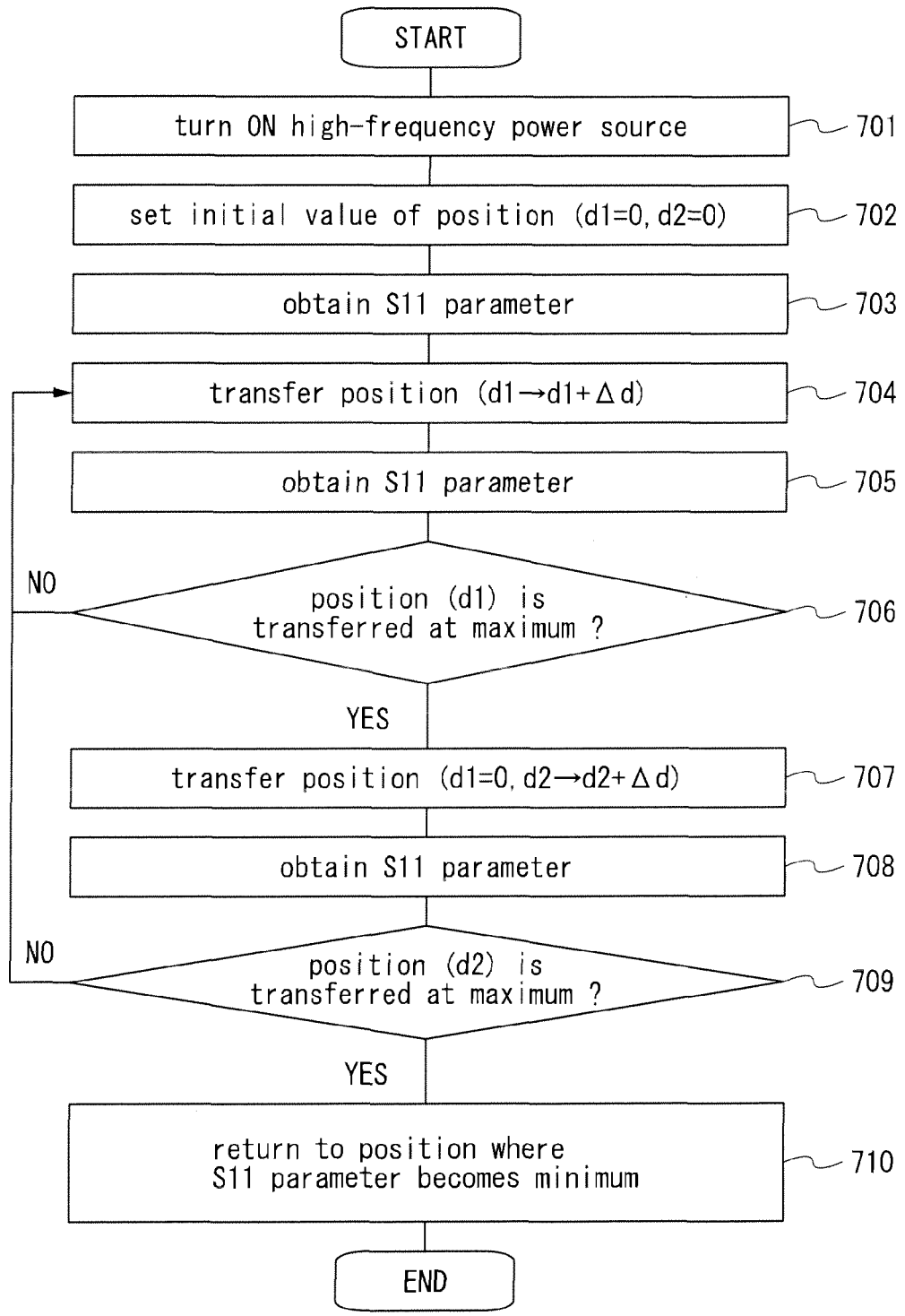
FIG. 7 is a flowchart illustrating Embodiment 2.

In a step 701 in FIG. 7, the high-frequency power source 103 is turned ON. Accordingly, AC voltage with a predetermined oscillation frequency ($f_0$) is continuously output.

Next, in a step 702, an initial value of the position (d1) of the first resonant coil 106 or the first resonant circuit 111 is set (d1=0) and an initial value of the position (d2) of the second resonant coil 112 or the second resonant circuit 116 is set (d2=0).

Next, in a step 703, the S11 parameter showing a reflection component of the transmission coil 105 which is output from the detector 108 is obtained. In the step 703, in the block diagram shown in FIG. 6, the first control circuit 117 receives a signal in accordance with the intensity of the S11 parameter, which is output from the detector 108.

Next, in a step 704, the first moving unit 118 transfers the position (d1) of the first resonant coil 106 or the first resonant circuit 111 by Δd (→+Δd) in accordance with a signal transmitted from the first control circuit 117 in accordance with the S11 parameter obtained in the step 703.

Next, in a step 705, the S11 parameter showing a reflection component of the transmission coil 105 which is output from the detector 108 is obtained again. In the step 705, in the block diagram shown in FIG. 6, the first control circuit 117 receives a signal from the detector 108 in accordance with the intensity of the S11 parameter, which changes in accordance with transferring of the position (d1) of the first resonant coil 106 or the first resonant circuit 111.

Next, a step 706, in which whether the position (d1) of the first resonant coil 106 or the first resonant circuit 111 is transferred at the maximum (d1→max) or not is detected, is followed by the step 704 in the case where the position (d1) of the first resonant coil 106 or the first resonant circuit 111 is not transferred at the maximum (d1→max), and the first moving unit 118 transfers the position (d1) of the first resonant coil 106 or the first resonant circuit 111 to obtain the S11 parameter. On the other hand, the step 706 proceeds to a step 707 in the case where the position (d1) of the first resonant coil 106 or the first resonant circuit 111 is transferred at the maximum (d1→max). In the step 706, in the block diagram shown in FIG. 6, the first control circuit 117 transmits a signal for transferring the position (d1) of the first resonant coil 106 or the first resonant circuit 111 to the first moving unit 118, and receives a signal from the detector 108 in accordance with the intensity of the S11 parameter, which changes in accordance with transferring of the position (d1) of the first resonant coil 106 or the first resonant circuit 111.

Next, in the step 707, the moving unit 110 transfers the position (d1) of the first resonant coil 106 or the first resonant circuit 111 to the initial value (d1=0) again, and the second moving unit 123 transfers the position (d2) of the second resonant coil 112 or the second resonant circuit 116 by Δd (→Δ+M) in accordance with a signal transmitted from the first control circuit 117 to the second control circuit 122. In the step 707, in the block diagram in FIG. 6, a signal from the first control circuit 117 is transmitted from the first transmission/reception circuit 120 to the second transmission/reception circuit 121 and then transmitted to the second control circuit 122. The second moving unit 123 transfers the position (d2) of the second resonant coil 112 or the second resonant circuit 116 by Δd (→+ΔM) in accordance with a signal transmitted from the second control circuit 122.

Next, in a step 708, the S11 parameter showing a reflection component of the transmission coil 105 which is output from the detector 108 is obtained again. In the step 708, in the block diagram shown in FIG. 6, the second control circuit 122 receives a signal from the detector 108 in accordance with the intensity of the S11 parameter, which changes in accordance with transferring of the position (d2) of the second resonant coil 112 or the second circuit 116 by the second moving unit 123.

Next, a step 709, in which whether the position (d2) of the second resonant coil 112 or the second resonant circuit 116 is transferred at the maximum (d2→max) or not is detected, is followed by the step 706 in the case where the position (d2) of the second resonant coil 112 or the second resonant circuit 116 is not transferred at the maximum (d2→max), and the second moving unit 123 transfers the position (d2) of the second resonant coil 112 or the second resonant circuit 116 to obtain the S11 parameter. On the other hand, the step 709 proceeds to a step 710 in the case where the position (d2) of the second resonant coil 112 or the second resonant circuit 116 is transferred at the maximum (d2→max).

In a step 710, the position (d1) of the first resonant coil 106 or the first resonant circuit 111 and the position (d2) of the second resonant coil 112 or the second resonant circuit 116 are returned to the position at which the S11 parameter is the minimum, among positions of combinations of the position (d1) and position (d2), which are transferred by the first moving unit 118 and the second moving unit 123, respectively. Thus, the transmission/reception of the signal is finished.

Figure 8:
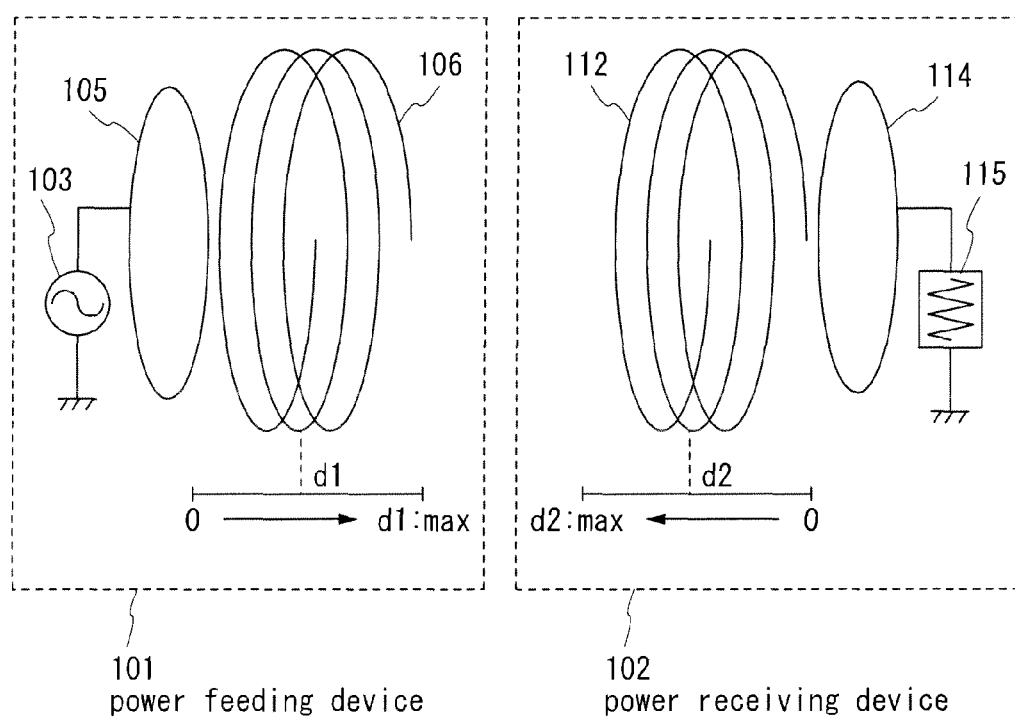
FIG. 8 is a diagram illustrating Embodiment 2.

Note that the position (d1) of the first resonant coil 106 or the first resonant circuit 111 and the position (d2) of the second resonant coil 112 or the second resonant circuit 116 transferred as shown in FIG. 8. That is to say, the first moving unit 118 transfers the position (d1) of the first resonant coil 106 from the initial value (d1=0) to the maximum value (d1=max). Further, the second moving unit 123 transfers the position (d2) of the second resonant coil 112 from the initial value (d2=0) to the maximum value (d2=max). Note that the resonant circuits (e.g., the first resonant circuit 111 and the second resonant circuit 116) including the capacitor is similarly transferred in a similar manner to FIG. 8 where the capacitor is omitted.

Figure 9B:
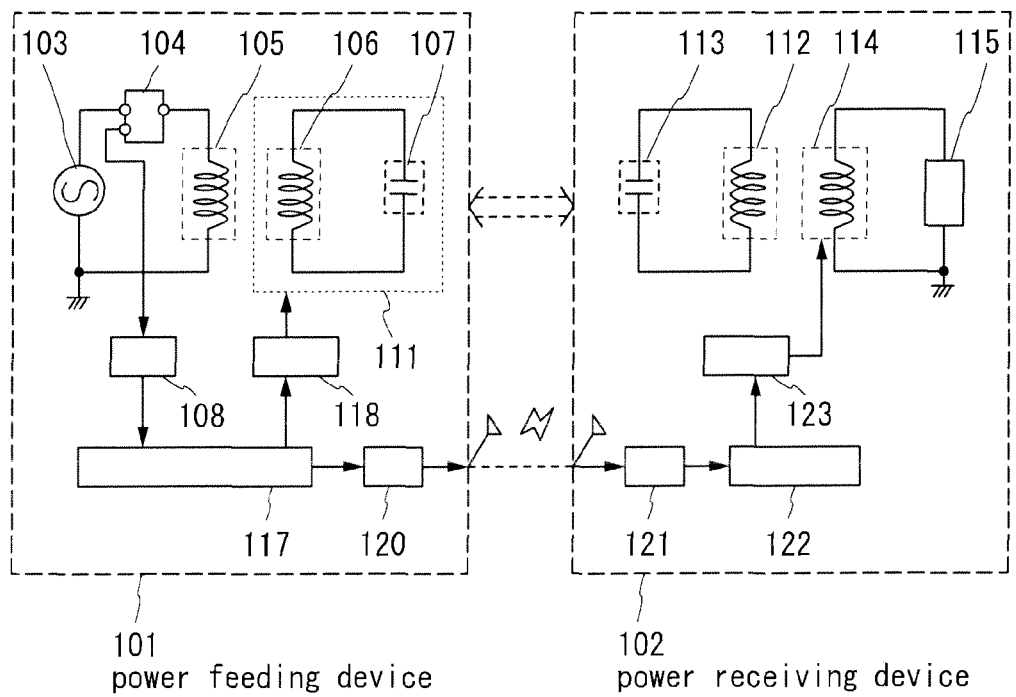

Further, in the structure shown in this embodiment, the first moving unit 118 may transfer the position of the transmission coil 105 in accordance with a signal transmitted from the first control circuit 117, and the second moving unit 123 may transfer the position of the second resonant coil 112 or the second resonant circuit 116 in accordance with a signal transmitted from the second control circuit 122, in accordance with the S11 parameter as shown in FIG. 9A. Furthermore, the first moving unit 118 may transfer the position of the first resonant coil 106 or the first resonant circuit 111 in accordance with a signal transmitted from the first control circuit 117, and the second moving unit 123 may transfer the position of the reception coil 114 in accordance with a signal transmitted from the second control circuit 122, in accordance with the S11 parameter as shown in FIG. 9B.

Figure 10A:
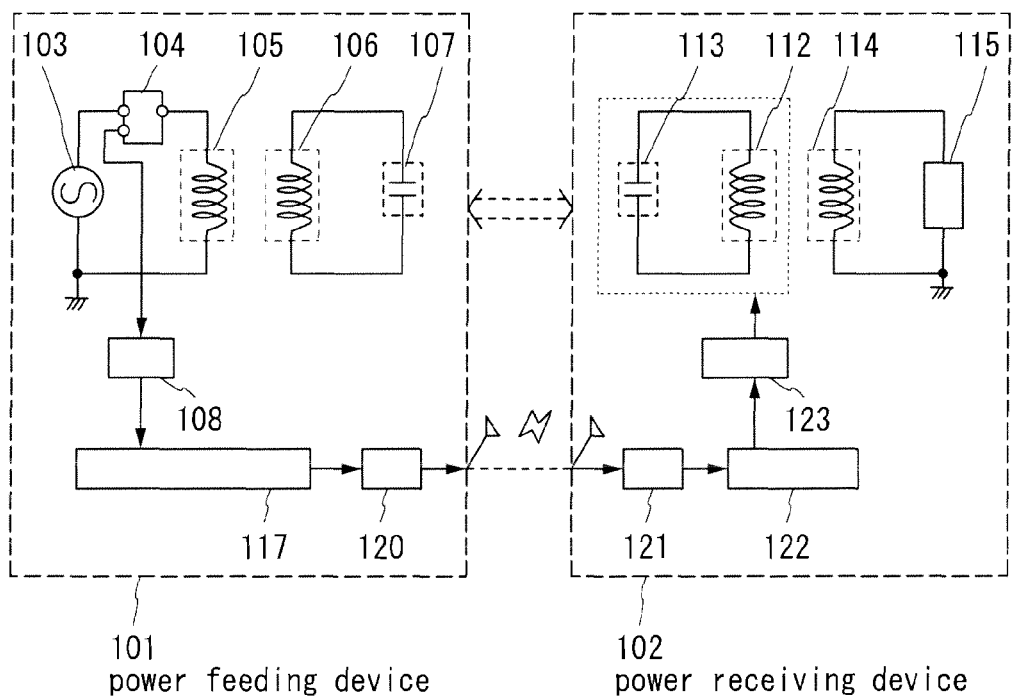
FIGS. 10A and 10B are diagrams illustrating Embodiment 2.
Figure 10B:
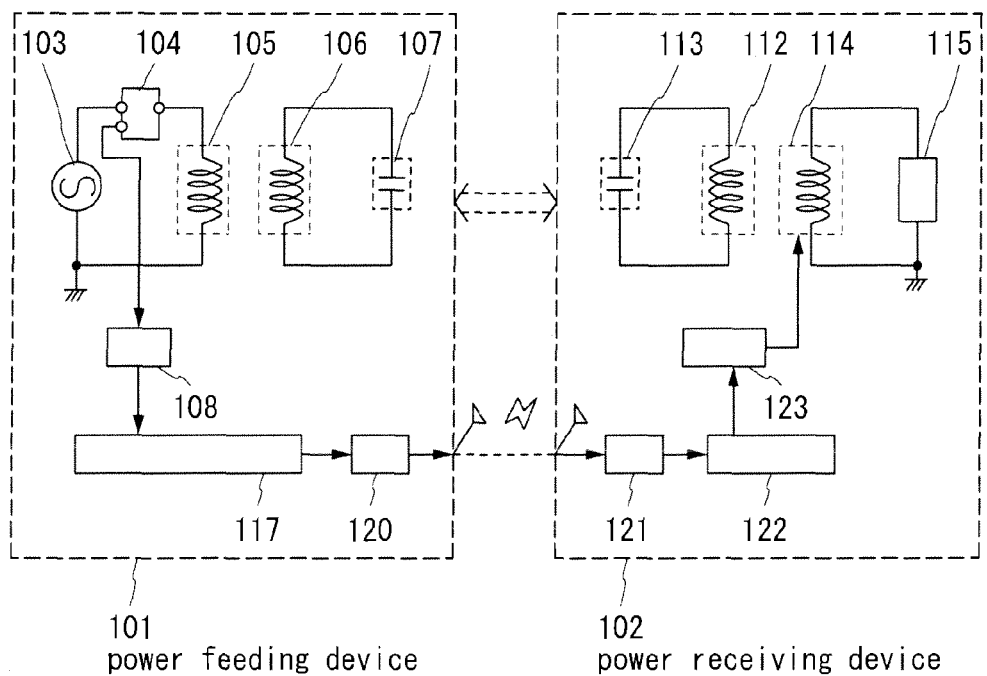

Further, in the structure shown in this embodiment, the first control circuit 117 may transmit a signal in accordance with the S11 parameter from the first transmission/reception circuit 120 to the second transmission/reception circuit 121 and then transmitted to the second control circuit 122; then, the second moving unit 123 may transfer the position of the second resonant coil 112 or the second resonant circuit 116 in accordance with the signal transmitted from the second control circuit 122, as shown in FIG. 10A. Furthermore, the first control circuit 117 may transmit a signal in accordance with the S11 parameter from the first transmission/reception circuit 120 to the second transmission/reception circuit 121 and then transmitted to the second control circuit 122; then, the second moving unit 123 may transfer the position of the reception coil 114 in accordance with the signal transmitted from the second control circuit 122, as shown in FIG. 10B.

An embodiment of the present invention shown in this embodiment can provide a power feeding device utilizing the electromagnetic resonance coupling method, and a contactless power feeding system provided with the power feeding device. In the power feeding device, regardless of a power feeding device and a power receiving device (coupling coefficient of electromagnetic resonance coupling), the coupling coefficient of electromagnetic induction coupling is adjusted by change in positions of a transmission coil and a resonant coil in the power feeding device, and a reflection component (S11 parameter) of electric power output from a high-frequency over source can be the minimum; accordingly, electric power transmission efficiency can be improved.

Note that this embodiment can be implemented in combination with any of the structures described in other embodiments, as appropriate.

Embodiment 3

In this embodiment, application of the contactless power feeding system explained in the above embodiments will be described. Note that examples of the application of the contactless power feeding system of the present invention are a portable telephone, a digital video camera, a computer, a portable information terminal (such as a mobile computer, a portable telephone, a portable game machine, or an electronic book), and an image reproduction device including a recording medium (specifically, a digital versatile disc, or 'DVD'), which are portable electronic devices; a household electrical appliance such as a rice cooker, a television, or refrigerator; and an electric propulsion mobile unit which is driven by using electric power, such as an electric car, and the like. Examples thereof will be described with reference to drawings below.

Figure 11A:
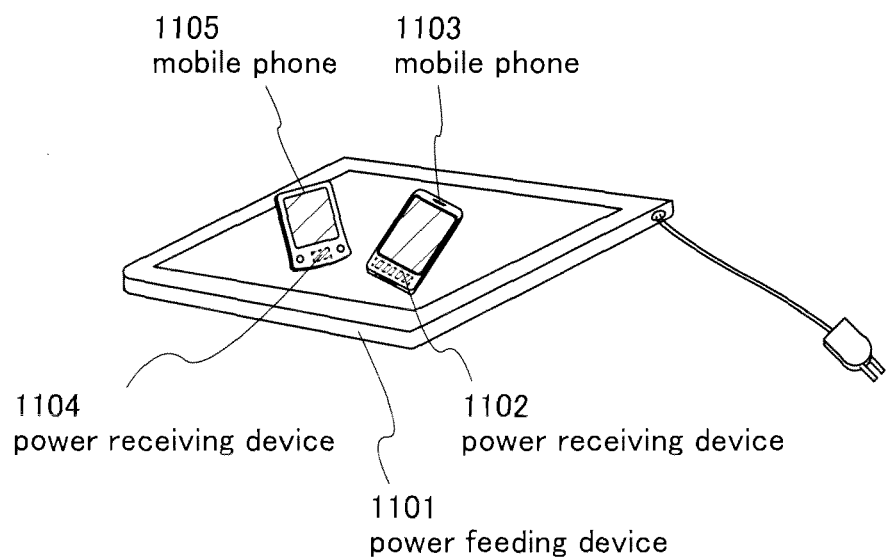
FIGS. 11A and 11B are diagrams illustrating Embodiment 3.

FIG. 11A illustrates an example in which a mobile phone and a portable information terminal are given as applications of the contactless power feeding system, which includes a power feeding device 1101, a mobile phone 1103 including a power receiving device 1102, and a mobile phone 1105 including a power receiving device 1104. The contactless power feeding system explained in the above embodiment can be applied between the power feeding device 1101 and the power receiving device 1102 and between the power feeding device 1101 and the power receiving device 1104. In this manner, a mobile phone a portable information terminal with improved electric power transmission efficiency can be provided.

Figure 11B:
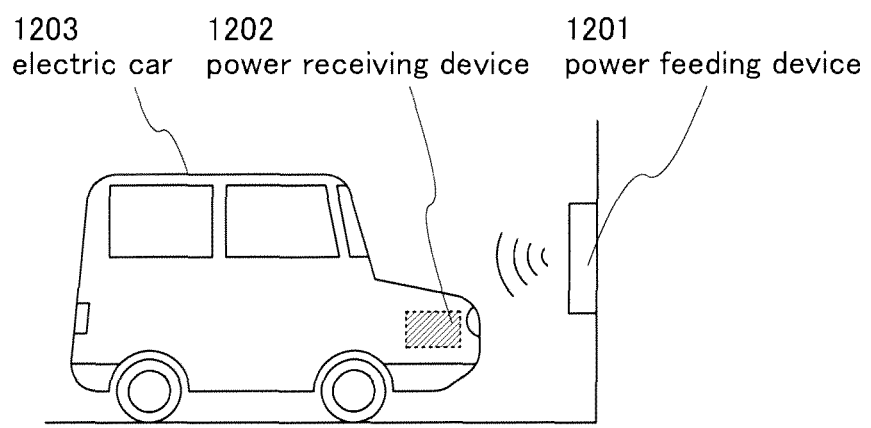

FIG. 11B illustrates an example in which an electric car, which is a electric vehicle, is given as an application of the contactless power feeding system. The contactless power feeding system includes a power feeding device 1201 and an electric car 1203 including a power receiving device 1202. The contactless power feeding System explained in the above embodiment can be applied between the power feeding device 1201 and the power receiving device 1202. In this manner, an electric car with improved electric power transmission efficiency can be provided.

The contactless power feeding system explained in the above embodiments can be provided for any product driven by electric power.

Note that this embodiment can be implemented in combination with any of the structures described in other embodiments, as appropriate.

Example 1

Figure 12:
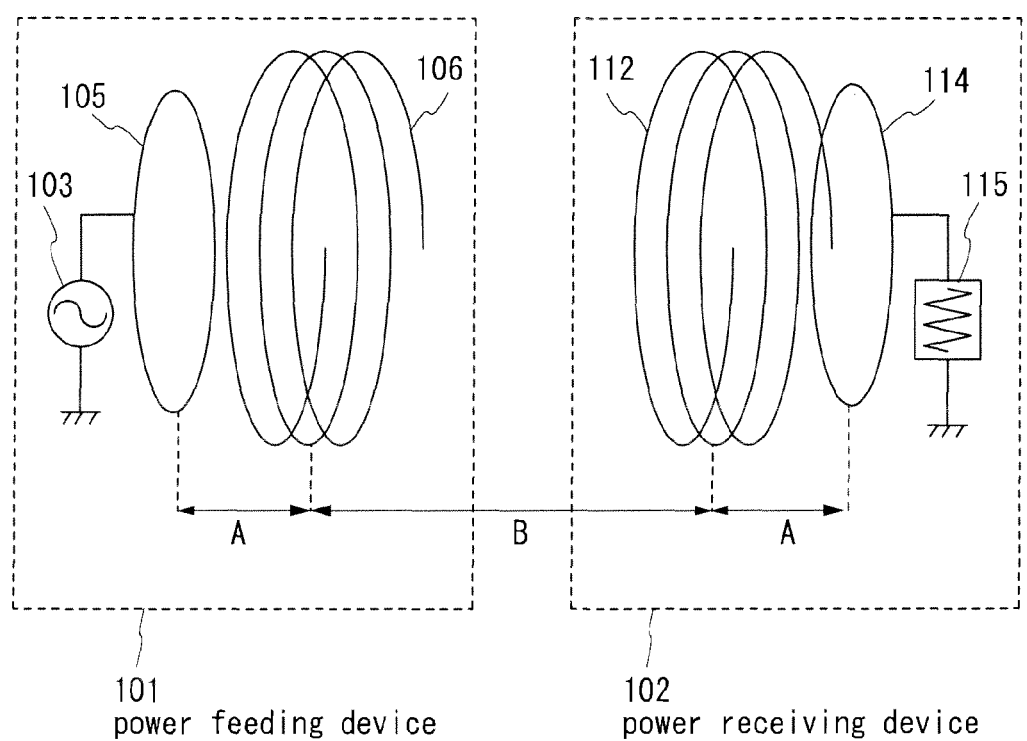
FIG. 12 is a diagram illustrating Example 1.

In this example, the transmission efficiency of the contactless power feeding system including the power feeding device 101 and the power receiving device 102 was evaluated in the following manner: the power feeding device 101 and the power receiving device 102 were provided, as shown in FIG. 12, the positions of coils (the transmission coil 105, the first resonant coil 106, the second resonant coil 112, and the reception coil 114) included in the power feeding device 101 and the power receiving device 102 were changed and the S21 parameter was measured. Note that the S21 parameter was a parameter of transmission efficiency and shows the ratio of carrier wave power to incident wave power ((carrier wave power)/(incident wave power)).

One turn of a coil with a diameter ($\phi$) of 150 mm was used for the transmission coil 105 and the reception coil 114 and five turns of a coil and a diameter ($\phi$) of 150 mm was used for the first resonant coil 106 and the second resonant coil 112. The resonance frequency ($f_O$) output from the high-frequency power source 103 was set to 13.56 MHz (adding an air variable condenser with 150 pF or less). Note that the S21 parameter was measured using a network analyzer (E4071B) (made by Agilent Technologies Inc.).

Figure 13:
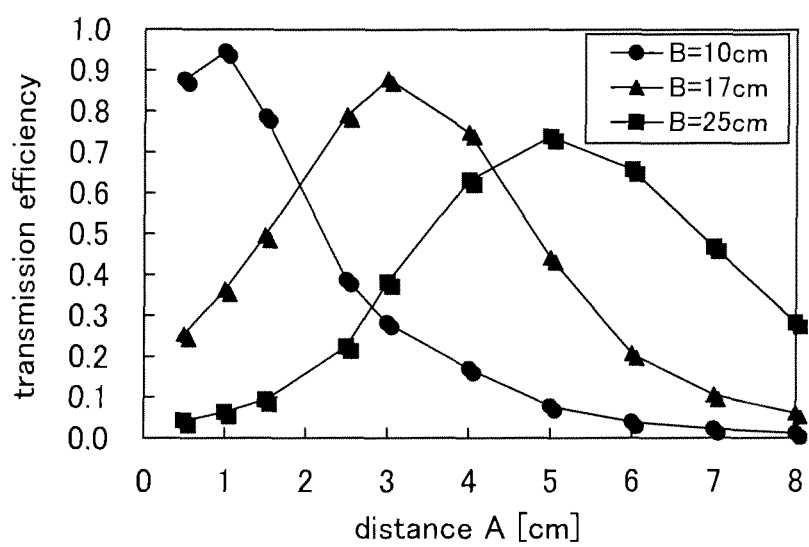
FIG. 13 is a graph illustrating measurement result of transmission efficiency in Example 1.

Note that in this example, as shown in FIG. 12, both a distance between the first resonant coil 106 and the transmission coil 105 and a distance between the second resonant coil 112 and the reception coil 114 were A (cm), and a distance between the first resonant coil 106 and the second resonant coil 112 was B (cm). FIG. 13 shows a result of measuring the transmission efficiency as A changes where B is a fixed distance (B=10 cm, 17 cm, 25 cm).

It is identified by the result shown in FIG. 13 that as the distance (B) between the first resonant coil 106 and the second resonant coil 112 becomes longer, high transmission efficiency can be obtained by lengthening the distances (A) between the first resonant coil 106 and the transmission coil 105 and between the second resonant coil 112 and the reception coil 114.

This application is based on Japanese Patent Application serial no. 2010-287380 filed with Japan. Patent Office on Dec. 24, 2010, the entire contents of which are hereby incorporated by reference.

What is claimed is:

1. A power feeding device comprising:
a high-frequency power source;
a transmission coil electrically connected to the high-frequency power source;
a first resonant circuit comprising a first resonant coil;
a detector;
a first control circuit electrically connected to the detector; and
a first transmission/reception circuit electrically connected to the first control circuit; and
a first moving unit electrically connected to the first control circuit;
wherein the power feeding device is configured to perform electromagnetic resonance coupling with a power receiving device comprising:
a load;
a reception coil electrically connected to the load;
a second resonant circuit comprising a second resonant coil;
a second transmission/reception circuit;
a second control circuit electrically connected to the second transmission/reception circuit; and
a second moving unit electrically connected to the second control circuit,
wherein the high-frequency power source is configured to output an electric power through the transmission coil to the reception coil,
wherein the first resonant coil is configured to perform electromagnetic induction coupling with the transmission coil,
wherein the detector is configured to detect a reflection component of the electric power reflected at the transmission coil,
wherein the first control circuit is configured to output a signal in accordance with the reflection component of the electric power to the first transmission/reception circuit,
wherein the first transmission/reception circuit is configured to transmit the signal,
wherein the second resonant coil is configured to perform electromagnetic induction coupling with the reception coil,
wherein the second transmission/reception circuit is configured to receive the signal and output the signal to the second control circuit,
wherein the second control circuit is configured to output the signal to the second moving unit,
wherein the second moving unit is configured to control a distance between the reception coil and the second resonant circuit in accordance with the signal, and
wherein the second moving unit is configured to control a position of the second resonant circuit in accordance with the signal.

2. A power feeding device according to claim 1,
wherein the first moving unit comprises an electric motor.

3. A power feeding device according to claim 1,
wherein the first moving unit is configured to control a position of the transmission coil in accordance with the signal.

4. A power feeding device according to claim 3,
wherein the detector is configured to detect an S11 parameter of the transmission coil, and
wherein the first control circuit is configured to output the signal in accordance with the S11 parameter.

5. A power feeding device according to claim 1,
wherein the first moving unit is configured to control a position of the first resonant circuit in accordance with the signal.

6. A power feeding device according to claim 5,
wherein the detector is configured to detect an S11 parameter of the transmission coil, and
wherein the first control circuit is configured to output the signal in accordance with the S11 parameter.

7. A contactless power feeding system comprising the power feeding device according to claim 1.

8. A contactless power feeding system comprising:
a power feeding device; and
a power receiving device,
wherein the power feeding device comprises:
a high-frequency power source;
a transmission coil electrically connected to the high-frequency power source;
a first resonant circuit comprising a first resonant coil;
a detector;
a first control circuit electrically connected to the detector; and
a first transmission/reception circuit electrically connected to the first control circuit,
wherein the power receiving device comprises:
a load;
a reception coil electrically connected to the load;
a second resonant circuit comprising a second resonant coil;
a second transmission/reception circuit;

a second control circuit electrically connected to the second transmission/reception circuit; and
a second moving unit electrically connected to the second control circuit,
wherein the power feeding device is configured to perform electromagnetic resonance coupling with the power receiving device,
wherein the high-frequency power source is configured to output an electric power through the transmission coil,
wherein the first resonant coil is configured to perform electromagnetic induction coupling with the transmission coil,
wherein the detector is configured to detect a reflection component of the electric power reflected at the transmission coil,
wherein the first control circuit is configured to output a signal in accordance with the reflection component of the electric power to the first transmission/reception circuit,
wherein the first transmission/reception circuit is configured to transmit the signal,
wherein the second resonant coil is configured to perform electromagnetic induction coupling with the reception coil,
wherein the second transmission/reception circuit is configured to receive the signal and output the signal to the second control circuit,
wherein the second control circuit is configured to output the signal to the second moving unit,
wherein the second moving unit is configured to control a distance between the reception coil and the second resonant circuit in accordance with the signal, and
wherein the second moving unit is configured to control a position of the second resonant circuit in accordance with the signal.

9. A contactless power feeding system according to claim 8,
wherein the second moving unit comprises an electric motor.

10. A contactless power feeding system according to claim 8,
wherein the power feeding device comprises a first moving unit electrically connected to the first control circuit,
wherein the first moving unit is configured to receive the signal from the first control circuit and control a position of the first resonant circuit in accordance with the signal.

11. A contactless power feeding system according to claim 10,
wherein the first moving unit comprises an electric motor.

12. A contactless power feeding system according to claim 8,
wherein the power feeding device comprises a first moving unit electrically connected to the first control circuit,
wherein the first moving unit is configured to receive the signal from the first control circuit and control a position of the transmission coil in accordance with the signal.

13. A contactless power feeding system according to claim 12,
wherein the first moving unit comprises an electric motor.

14. A contactless power feeding system comprising:
a power feeding device; and
a power receiving device,
wherein the power feeding device comprises:
a high-frequency power source;
a transmission coil electrically connected to the high-frequency power source;
a first resonant circuit comprising a first resonant coil;
a detector;
a first control circuit electrically connected to the detector; and
a first transmission/reception circuit electrically connected to the first control circuit,
wherein the power receiving device comprises:
a load;
a reception coil electrically connected to the load;
a second resonant circuit comprising a second resonant coil;
a second transmission/reception circuit;
a second control circuit electrically connected to the second transmission/reception circuit; and
a second moving unit electrically connected to the second control circuit,
wherein the power feeding device is configured to perform electromagnetic resonance coupling with the power receiving device,
wherein the high-frequency power source is configured to output an electric power through the transmission coil,
wherein the first resonant coil is configured to perform electromagnetic induction coupling with the transmission coil,
wherein the detector is configured to detect a reflection component of the electric power reflected at the transmission coil,
wherein the first control circuit is configured to output a signal in accordance with the reflection component of the electric power to the first transmission/reception circuit,
wherein the first transmission/reception circuit is configured to transmit the signal,
wherein the second resonant coil is configured to perform electromagnetic induction coupling with the reception coil,
wherein the second transmission/reception circuit is configured to receive the signal and output the signal to the second control circuit,
wherein the second control circuit is configured to output the signal to the second moving unit,
wherein the second moving unit is configured to control a distance between the reception coil and the second resonant circuit in accordance with the signal, and
wherein the second moving unit is configured to control a position of the reception coil in accordance with the signal.

15. A contactless power feeding system according to claim 14,
wherein the second moving unit comprises an electric motor.

16. A contactless power feeding system according to claim 14,
wherein the power feeding device comprises a first moving unit electrically connected to the first control circuit,
wherein the first moving unit is configured to receive the signal from the first control circuit and control a position of the first resonant circuit in accordance with the signal.

17. A contactless power feeding system according to claim 16,
wherein the first moving unit comprises an electric motor.

18. A contactless power feeding system according to claim 14,
wherein the power feeding device comprises a first moving unit electrically connected to the first control circuit,
wherein the first moving unit is configured to receive the signal from the first control circuit and control a position of the transmission coil in accordance with the signal.

19. A contactless power feeding system according to claim 18, wherein the first moving unit comprises an electric motor.

* * * * *